USU10121001B1

(12) United States Patent
Zeng et al.

(10) Patent No.: US 10,121,001 B1
(45) Date of Patent: Nov. 6, 2018

(54) SYSTEM AND METHOD FOR MONOLITHIC SCHEDULING IN A PORTABLE COMPUTING DEVICE USING A HYPERVISOR

(71) Applicant: QUALCOMM INCORPORATED, San Diego, CA (US)

(72) Inventors: Thomas Zeng, San Diego, CA (US); Azzedine Touzni, Carlsbad, CA (US); Satyaki Mukherjee, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/629,516

(22) Filed: Jun. 21, 2017

(51) Int. Cl.
 G06F 7/04 (2006.01)
 G06F 21/55 (2013.01)
 G06F 9/455 (2018.01)
 G06F 9/48 (2006.01)

(52) U.S. Cl.
 CPC ........ G06F 21/554 (2013.01); G06F 9/45558 (2013.01); G06F 9/4881 (2013.01); G06F 21/552 (2013.01); G06F 2009/45562 (2013.01); G06F 2009/45587 (2013.01); G06F 2009/45591 (2013.01); G06F 2221/034 (2013.01)

(58) Field of Classification Search
 CPC .. G06F 21/554; G06F 9/4881; G06F 9/45558; G06F 21/552; G06F 2009/45562; G06F 2009/45587; G06F 2009/45591
 USPC ........................................................... 726/23
 See application file for complete search history.

(56) References Cited

U.S. PATENT DOCUMENTS

| 8,010,679 | B2 | 8/2011 | Low et al. | |
|---|---|---|---|---|
| 8,225,317 | B1 * | 7/2012 | Chiueh | G06F 9/455 713/164 |
| 9,465,617 | B1 | 10/2016 | Warkentin et al. | |
| 2010/0235836 | A1 * | 9/2010 | Bratanov | G06F 11/3466 718/1 |
| 2014/0173597 | A1 * | 6/2014 | Anand | G06F 9/455 718/1 |

(Continued)

OTHER PUBLICATIONS

IT University of Copenhagen, "Operating System Support for Run-Time Security with a Trusted Execution Environment," Javier Gonzalez, Jan. 31, 2015, pp. No. 01-187.

Primary Examiner — Mohammad W Reza
(74) Attorney, Agent, or Firm — Smith Tempel Blaha LLC/Qualcomm

(57) ABSTRACT

Systems for a method for monolithic workload scheduling in a portable computing device ("PCD") having a hypervisor are disclosed. An exemplary method comprises instantiating a primary virtual machine at a first exception level, wherein the primary virtual machine comprises a monolithic scheduler configured to allocate workloads within and between one or more guest virtual machines in response to one or more interrupts, instantiating a secure virtual machine at the first exception level and instantiating one or more guest virtual machines at the first exception level as well. When an interrupt is received at a hypervisor associated with a second exception level, the interrupt is forwarded to the monolithic scheduler along with hardware usage state data and guest virtual machine usage state data. The monolithic scheduler may, in turn, generate one or more context switches which may comprise at least one intra-VM context switch and at least one inter-VM context switch.

26 Claims, 7 Drawing Sheets

(56) References Cited

U.S. PATENT DOCUMENTS

2015/0370592 A1    12/2015  Tuch et al.
2017/0139861 A1*  5/2017  Arndt ..................... G06F 12/122
2018/0101486 A1*  4/2018  Lu ......................... G06F 13/161

* cited by examiner

SYSTEM AND METHOD FOR MONOLITHIC SCHEDULING IN A PORTABLE COMPUTING DEVICE USING A HYPERVISOR

DESCRIPTION OF THE RELATED ART

Portable computing devices ("PCDs") are becoming necessities for people on personal and professional levels. These devices may include cellular telephones, portable digital assistants ("PDAs"), portable game consoles, palmtop computers, and other portable electronic devices. Consequently, PCD designers are constantly looking for ways to make PCDs more efficient in their use of processing resources so that users may better leverage the PCD functionality. That is, PCD designers look for ways to improve the quality of service ("QoS") delivered by a PCD.

One way to efficiently share hardware capacity across multiple running applications, thereby improving QoS, is to use a hypervisor. Typically, such as in servers and desktop computers, a hypervisor running at an exception level 2 enables a fully virtualized computing platform where multiple virtual machines ("VMs"), each VM perhaps executing according to a different operating system kernel at an exception level 1, may share hardware resources. Interrupt handling and task scheduling (i.e., context switch management) is distributed between the hypervisor and the various virtual machines—the hypervisor schedules inter-VM workload allocations and the individual VMs schedule their own intra-VM workload allocations. In this way, the database used to store VM states at the time of a context switch is managed by, and accessible to, only the hypervisor running at the higher exception level 2. This type of hypervisor arrangement is called a "scheduler on scheduler" arrangement.

However, simply employing a hypervisor scheme that uses a scheduler on scheduler arrangement is problematic in a PCD because, although the OS kernel in EL1 has been optimized in the PCD industry, the EL2 scheduler has not. As such, employing a scheduler on scheduler arrangement in a PCD presents a highly complicated optimization problem that may take years for designers to overcome.

Accordingly, there is a need in the art for a hypervisor based system and method that avoids a scheduler on scheduler arrangement without compromising the security of the database used for managing context switches. More specifically, what is needed is a hypervisor based system and method that leverages a monolithic scheduler executed by a designated primary VM in exception level 1, the monolithic scheduler managing both inter-VM and intra-VM workload allocations.

SUMMARY OF THE DISCLOSURE

Various embodiments of methods and systems for a method for monolithic workload scheduling in a portable computing device ("PCD") having a hypervisor are disclosed. An exemplary method comprises instantiating a secure virtual machine at the first exception level (EL1), instantiating one or more guest virtual machines at the first exception level (EL1), and instantiating a primary virtual machine at an EL1 exception level, wherein the primary virtual machine comprises a monolithic scheduler configured to allocate workloads within and between one or more guest virtual machines in response to one or more interrupts. When an interrupt is received at a hypervisor associated with a second exception level (EL2), the interrupt is forwarded to the monolithic scheduler along with hardware usage state data and guest virtual machine usage state data (i.e., statistical data). The monolithic scheduler may, in turn, generate one or more context switches which may comprise at least one intra-VM context switch and at least one inter-VM context switch. Advantageously, the hypervisor may not include an inter-VM scheduler.

The hypervisor and secure virtual machine make resource usage states readable to the primary virtual machine and the one or more guest virtual machines in a secure manner such that only metadata is published. The exemplary method may further include scheduling a secure task to the secure virtual machine, monitoring a secure timer, and based on the secure timer, determining the presence or absence of malware. The method of claim 1, wherein the guest virtual machine usage state data comprises metastates about at least one of a queue size of the virtual cpu (VCPU) list, Quality of Service (QoS) indicators from the secure virtual machine, and Real-time integrity checker (RTIC) timer state of the user-mode exception level (EL0).

BRIEF DESCRIPTION OF THE DRAWINGS

In the drawings, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

DETAILED DESCRIPTION

Figure 1:
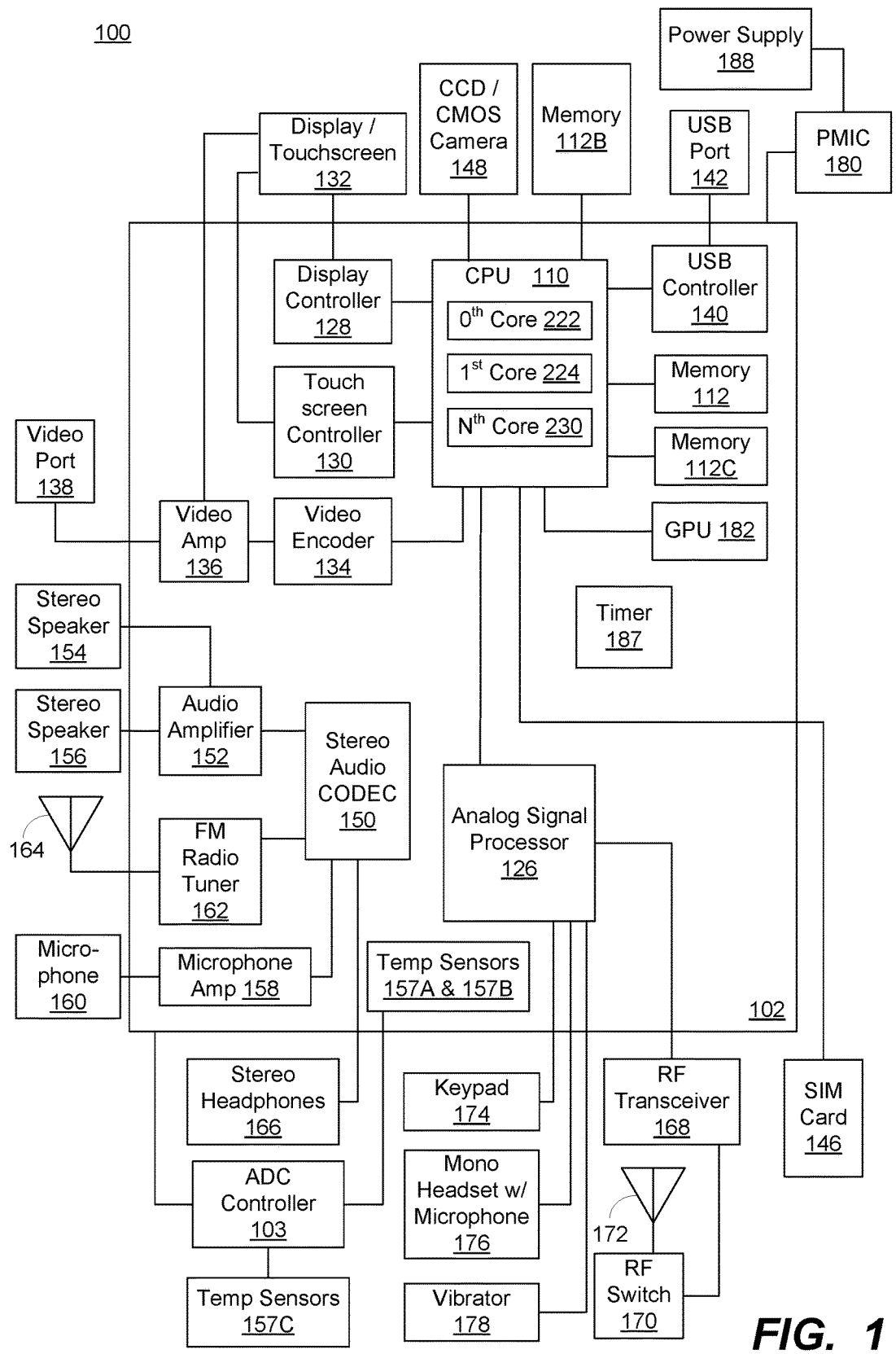
FIG. 1 is a functional block diagram of an exemplary, non-limiting aspect of a portable computing device ("PCD") in the form of a wireless telephone for implementing methods and systems for monolithic scheduling using a hypervisor.

The word "exemplary" is used herein to mean "serving as an example, instance, or illustration." Any aspect described herein as "exemplary" is not necessarily to be construed as exclusive, preferred or advantageous over other aspects.

In this description, the term "portable computing device" ("PCD") is used to describe any device operating on a limited capacity power supply, such as a battery. Although battery operated PCDs have been in use for decades, technological advances in rechargeable batteries coupled with the advent of third generation ("3G") and fourth generation ("4G") wireless technology have enabled numerous PCDs with multiple capabilities. Therefore, a PCD may be a cellular telephone, a satellite telephone, a pager, a PDA, a smartphone, a navigation device, a smartbook or reader, a media player, a combination of the aforementioned devices, a laptop computer with a wireless connection, among others.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

In this description, the term "virtual machine" refers to instantiated software entities running as guests on top of physical hardware in a system on a chip ("SoC"). As such, and as would be understood by one of ordinary skill in the art, multiple virtual machines may share hardware resources of the SoC such as, but not limited to, processors and memory components. A given virtual machine may run in a non-secure environment or a secure environment depending on the nature of its application or workload. Secure environments, within the context of this document, are meant to refer to those execution environments that run applications authorized to access, manage and update sensitive data stored with a PCD. Conversely, non-secure environments, within the context of this document, are meant to refer to those execution environments that run applications not authorized to directly access, manage or update sensitive data otherwise controlled by a secure execution environment.

A non-secure execution environment, for example, may be used to execute code associated with a high level operating system ("HLOS") and, as such, reference to an "HLOS" environment in this description may be interpreted as a reference to a non-secure execution environment. Conversely, a secure execution environment, for example, may be used to execute code associated with a TrustZone application and, as such, reference to a "TZ" environment in this description may be interpreted as a reference to a secure execution environment.

Further, in this description, the term "hypervisor" is meant to refer to a virtual machine manager in the form of a software program that coordinates with a primary VM running a monolithic scheduler to manage workload allocations and marshal the access of multiple guest VMs to one or more hardware components within a PCD. In this way, a hypervisor may be viewed as an execution environment for other execution environments. For example, when multiple guest VMs are simultaneously instantiated in a PCD, a hypervisor may provide for each guest VM, whether secure or non-secure, to appear as if it has dedicated access to a set of hardware components of the SoC even though each guest VM is actually sharing the hardware. The primary VM running the monolithic scheduler, working with the hypervisor, controls access for all guest VMs to a set of hardware components.

In this description, a "context switch" refers generally to the process of storing and restoring the workload state of a given guest VM so a process or thread of execution may be resumed from the same point at a later time. A context switch may be triggered by an interrupt or system call, as would be understood by one of ordinary skill in the art, and may necessitate reallocation of workloads within a given guest VM ("intra-VM") and/or reallocation of workloads between or among multiple guest VMs ("inter-VM").

In this description, it will be understood that execution of a workload occurs at one of four exception levels, although embodiments of the solution are not limited to application with a SoC that provides for only four exception levels. As would be understood by one of ordinary skill in the art, an exception level determines the level of privilege for the workload that is being executed subject to the exception level. Moreover, in this description an exception level with a larger value than another one is at a higher exception level. Conversely, an exception level with a smaller number than another will be understood as being at a lower exception level. Exception levels provide a logical separation of software execution privilege that applies across all operating states of the SoC. In this description, a piece of software, such as an application (EL0), the kernel of an operating system (EL1), or a hypervisor (EL2), occupies a single exception level as will become clear from the illustrations and description herein.

In this description, general reference to the term "memory," "memory component," "memory device," "computer-readable medium" or the like will be understood to envision both "volatile" and "non-volatile" types of memory components whether located "on-chip," "off-chip," "internal," "external" or otherwise relative to a PCD. Further, although generally depicted in this description as a single component, any of the various memory components may be a distributed memory device with separate data stores coupled to a digital signal processor (or additional processor cores).

As used in this description, the terms "component," "database," "module," "system" and the like are intended to refer to a computer-related entity, either hardware, firmware, a combination of hardware and software, software, or software in execution and represent exemplary means for providing the functionality and performing the certain steps in the processes or process flows described in this specification. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "central processing unit ("CPU")," "modem CPU," "digital signal processor ("DSP")," "chip" and "chipset" are non-limiting examples of processing components that may reside in a PCD and are used interchangeably except when otherwise indicated. Moreover, as distinguished in this description, a CPU, DSP, or a chip or chipset may be comprised of one or more distinct processing components generally referred to herein as "core(s)" and "sub-core(s)." Further to that which is defined above, a "processing component" may be, but is not limited to, a central processing unit, a graphical processing unit, a core, a main core, a sub-core, a processing area, a hardware engine, etc. or any component that resides within, or external to, an integrated circuit within a portable computing device and may be used to instruct a memory component or other hardware component, including itself, to enter a sleep, idle or standby state.

Embodiments of the solution employ a hypervisor in EL2 without a scheduler. Rather, a primary VM is instantiated in EL1 and charged with executing a monolithic scheduler configured to allocate workloads within and among guest VMs. Notably, in embodiments of the solution, the hypervisor is not configured to run workloads per se but, rather, is leveraged to limit or control memory access by the OS kernel running in EL1. As such, the stage 2 memory translation is used to control memory access instead of for creating a virtualized operating environment. Workload and task scheduling is handled by the OS kernel such that interrupts, hardware states and VM context states are provided to the monolithic scheduler by the hypervisor and/or guest VM.

The database normally accessible exclusively by the hypervisor in prior art arrangements is structured and organized such that it is exposed to the monolithic scheduler. Advantageously, by and through embodiments of the solution, only a single monolithic scheduler is required for workload allocations across guest VMs. The QoS experienced by a user, therefore, is dependent upon the single monolithic scheduler instead of a multi-level, unoptimized, scheduler on scheduler arrangement. A secure VM is dedicated to handling secure workloads in a trusted environment where malware cannot patch over from the kernel. A secure timer may be used to check the integrity of the primary OS through periodic scheduling of a task to the secure VM by the kernel. A validated match of approved signatures in view of the timer may be used to conclude that no malware has been detected.

FIG. 1 is a functional block diagram of an exemplary, non-limiting aspect of a portable computing device ("PCD") 100 in the form of a wireless telephone for implementing methods and systems for monolithic scheduling using a hypervisor. The hardware comprised within and without of SoC 102 may be leveraged by a hypervisor working with a monolithic scheduler in EL1 to support the workloads of guest VMs and/or a secure VM. As shown, the PCD 100 includes an on-chip system 102 that includes a central processing unit ("CPU") 110 and an analog signal processor 126 that are coupled together. The CPU 110 may comprise a zeroth core 222, a first core 224, and an Nth core 230 as understood by one of ordinary skill in the art. Further, instead of a CPU 110, a digital signal processor ("DSP") may also be employed as understood by one of ordinary skill in the art. Moreover, as is understood in the art of heterogeneous multi-core processors, each of the cores 222, 224, 230 may process different workloads associated with differing applications or functionality of the PCD 100 running in various execution environments. A secure timer 187 is accessible and available on the chip 102.

As illustrated in FIG. 1, a display controller 128 and a touch screen controller 130 are coupled to the CPU 110. A touch screen display 132 external to the on-chip system 102 is coupled to the display controller 128 and the touch screen controller 130.

PCD 100 may further include a video decoder 134, e.g., a phase-alternating line ("PAL") decoder, a sequential couleur avec memoire ("SECAM") decoder, a national television system(s) committee ("NTSC") decoder or any other type of video decoder 134. The video decoder 134 is coupled to the central processing unit ("CPU") 110. A video amplifier 136 is coupled to the video decoder 134 and the touch screen display 132. A video port 138 is coupled to the video amplifier 136. As depicted in FIG. 1, a universal serial bus ("USB") controller 140 is coupled to the CPU 110. Also, a USB port 142 is coupled to the USB controller 140. On-chip memory components 112A, 112C may also be coupled to the CPU 110. All or part of memory component 112C may actually reside within CPU 110 in the form of an L1 cache. Notably, memory component 112C may also include L2 and L3 cache, as is understood in the art. An off-chip memory component 112B, such as but not limited to a flash memory, and a subscriber identity module (SIM) card 146 may be external to chip 102 and coupled to CPU 110. Further, as shown in FIG. 1, a digital camera 148 may be coupled to the CPU 110. In an exemplary aspect, the digital camera 148 is a charge-coupled device ("CCD") camera or a complementary metal-oxide semiconductor ("CMOS") camera.

As further illustrated in FIG. 1, a stereo audio CODEC 150 may be coupled to the analog signal processor 126. Moreover, an audio amplifier 152 may be coupled to the stereo audio CODEC 150. In an exemplary aspect, a first stereo speaker 154 and a second stereo speaker 156 are coupled to the audio amplifier 152. FIG. 1 shows that a microphone amplifier 158 may be also coupled to the stereo audio CODEC 150. Additionally, a microphone 160 may be coupled to the microphone amplifier 158. In a particular aspect, a frequency modulation ("FM") radio tuner 162 may be coupled to the stereo audio CODEC 150. Also, an FM antenna 164 is coupled to the FM radio tuner 162. Further, stereo headphones 166 may be coupled to the stereo audio CODEC 150.

FIG. 1 further indicates that a radio frequency ("RF") transceiver 168 may be coupled to the analog signal processor 126. An RF switch 170 may be coupled to the RF transceiver 168 and an RF antenna 172. As shown in FIG. 1, a keypad 174 may be coupled to the analog signal processor 126. Also, a mono headset with a microphone 176 may be coupled to the analog signal processor 126. Further, a vibrator device 178 may be coupled to the analog signal processor 126. FIG. 1 also shows that a power supply 188, for example a battery, is coupled to the on-chip system 102 via a power management integrated circuit ("PMIC") 180. In a particular aspect, the power supply 188 includes a rechargeable DC battery or a DC power supply that is derived from an alternating current ("AC") to DC transformer that is connected to an AC power source.

The CPU 110 may also be coupled to one or more internal, on-chip thermal sensors 157A and 157B as well as one or more external, off-chip thermal sensors 157C. The on-chip thermal sensors 157A, 157B may comprise one or more proportional to absolute temperature ("PTAT") temperature sensors that are based on vertical PNP structure and are usually dedicated to complementary metal oxide semiconductor ("CMOS") very large-scale integration ("VLSI") circuits. The off-chip thermal sensors 157C may comprise one or more thermistors. The thermal sensors 157 may produce a voltage drop that is converted to digital signals with an analog-to-digital converter ("ADC") controller (not shown). However, other types of thermal sensors 157 may be employed without departing from the scope of the invention.

The touch screen display 132, the video port 138, the USB port 142, the camera 148, the first stereo speaker 154, the second stereo speaker 156, the microphone 160, the FM antenna 164, the stereo headphones 166, the RF switch 170, the RF antenna 172, the keypad 174, the mono headset 176, the vibrator 178, thermal sensors 157C, memory 112B, PMIC 180 and the power supply 188 are external to the on-chip system 102.

In a particular aspect, one or more of the method steps described herein to trigger state transitions in state machines associated with various execution environments may be implemented by executable instructions and parameters stored in the memory 112 and executed by the CPU 110, the analog signal processor 126, the GPU 182, or another processor, in addition to the ADC controller 103. Further, the processors 110, 126, the memory 112, the instructions stored therein, or a combination thereof may serve as a means for performing one or more of the method steps described herein.

Figure 2:
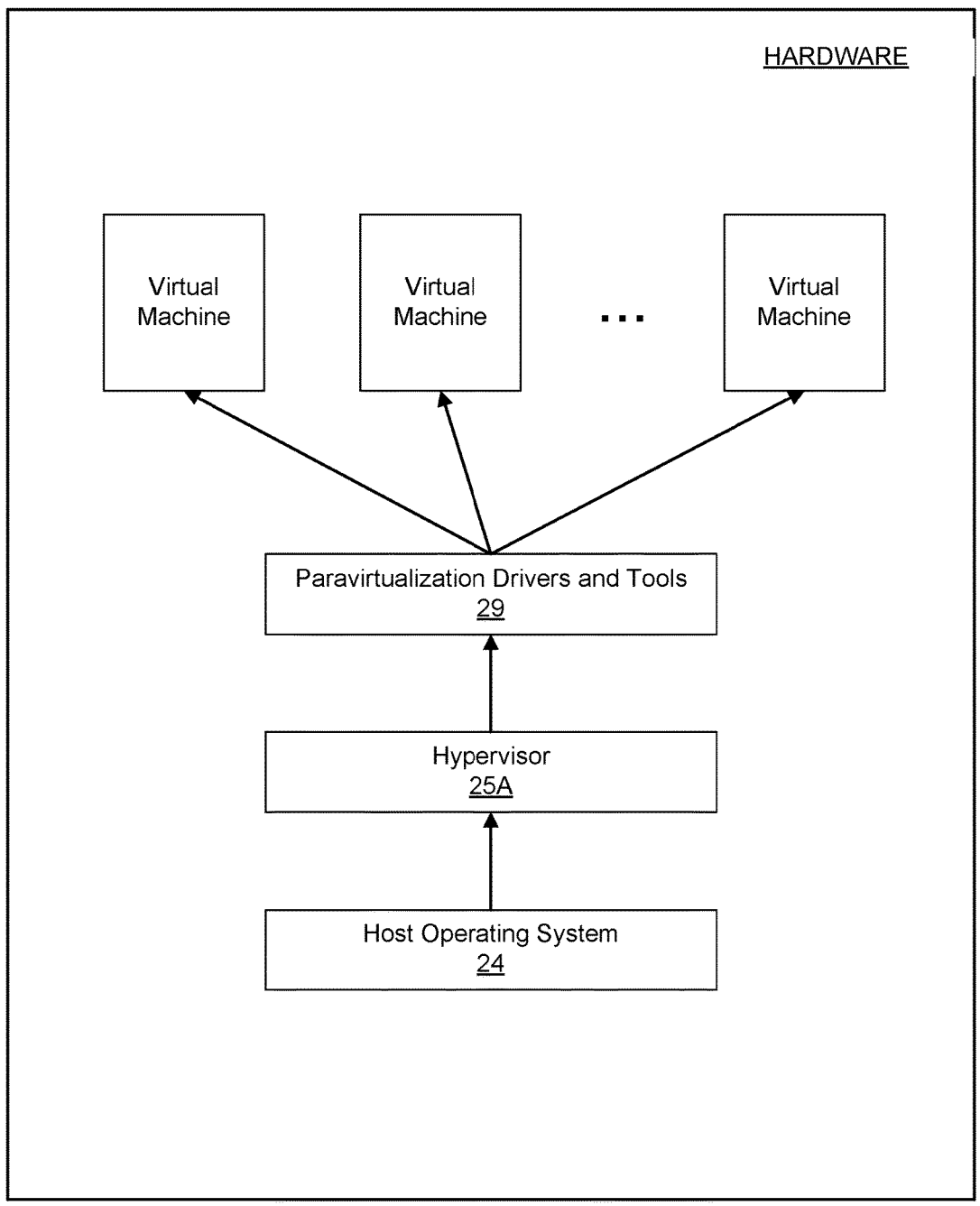
FIG. 2 illustrates a general arrangement of a hypervisor based structure for virtualized processing of workloads.

FIG. 2 illustrates a general arrangement of a hypervisor based structure for virtualized processing of workloads. Although the arrangement depicted in the FIG. 2 illustration is generally recognized as a hosted hypervisor, a hypervisor deployed as a bare-metal installation (an arrangement wherein the hypervisor communicates directly with the underlying physical hardware) may also be understood. As depicted, a host operating system 24 provides access to the various hardware resources. The hypervisor 25A, working in conjunction with the host operating system 24, coordinates through a set of paravirtualization drivers and tools 29 for the various virtual machines to share the hardware resources. In this way, the virtual machines each "think" that they have exclusive access to and use of the hardware resources when, in reality, the hardware resources are shared. In prior art arrangements, the nature of how the hardware resources are shared is determined through an inter-VM scheduler in the hypervisor 25A and an intra-VM scheduler in guest VMs. Advantageously, embodiments of the solution (as will be shown in more detail in subsequent figures) leverage a single, monolithic scheduler in a primary VM, thereby removing the need to host a scheduler in the hypervisor 25.

Figure 3:
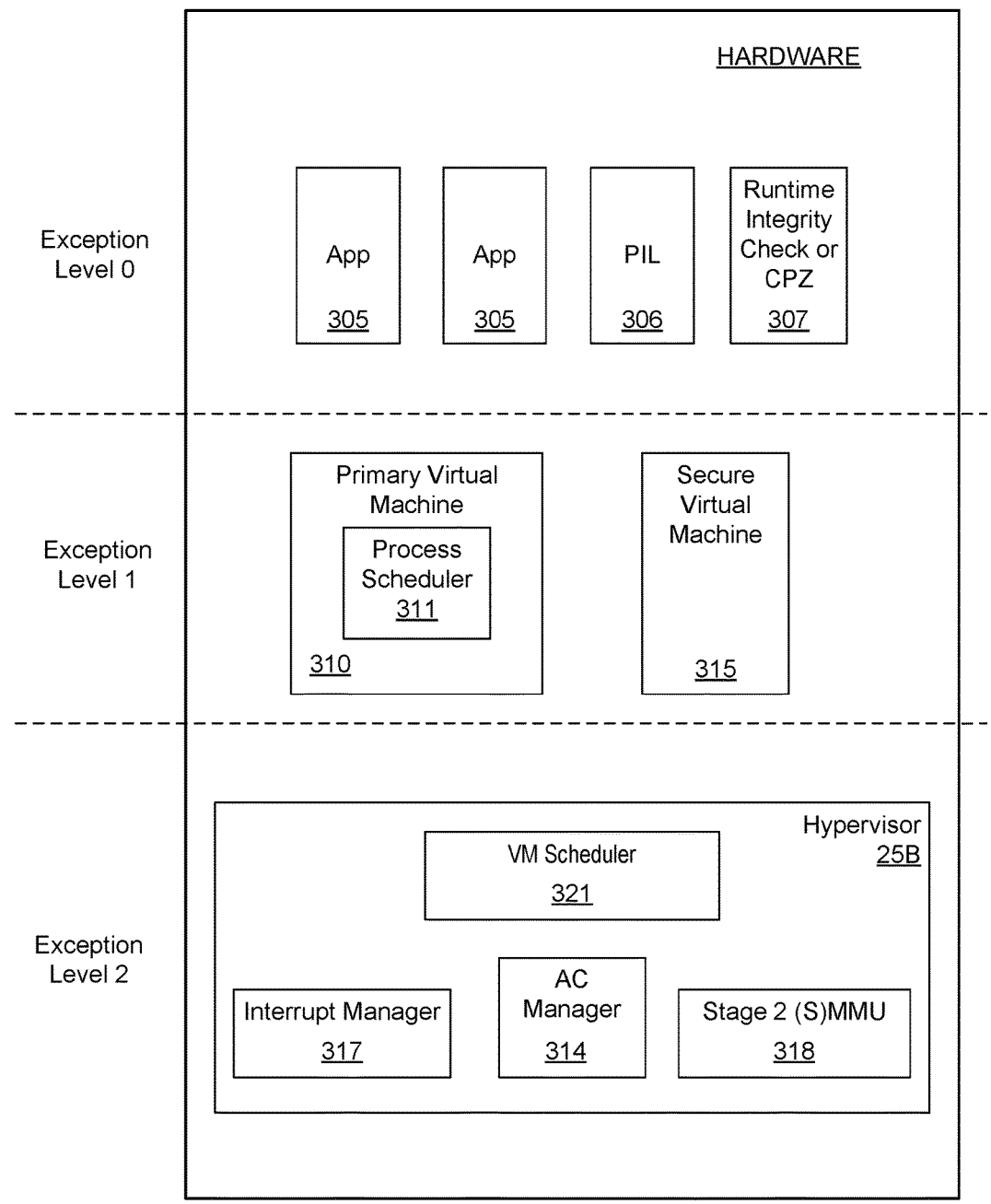
FIG. 3 illustrates a scheduler on scheduler arrangement for workload management using a hypervisor.

FIG. 3 illustrates a scheduler on scheduler arrangement 300 for workload management using a hypervisor 25B. As can be seen in the FIG. 3 illustration, the hypervisor 25B operates according to exception level 2 and includes an AC manager 314, and interrupt manager 317, a stage 2 MMU 318 and a virtual machine scheduler (an "inter-VM" scheduler) 321. A primary virtual machine 310 including a process scheduler (an "intra-VM" scheduler) 311 is instantiated at exception level 1 along with a secure virtual machine 315. In exception level 0, various applications 305, a graphics imaging library ("PIL") 306, and a run-time integrity checker 307 may be executed.

An interrupt received by the hypervisor 25B interrupt manager 317 may trigger an inter-VM scheduling event by the VM scheduler 321. States of execution may be saved in MMU 318. Any context switches between VMs may be scheduled by the VM scheduler 321 while any context switches within a VM may be scheduled by process scheduler 311 in primary VM 310.

Figure 4:
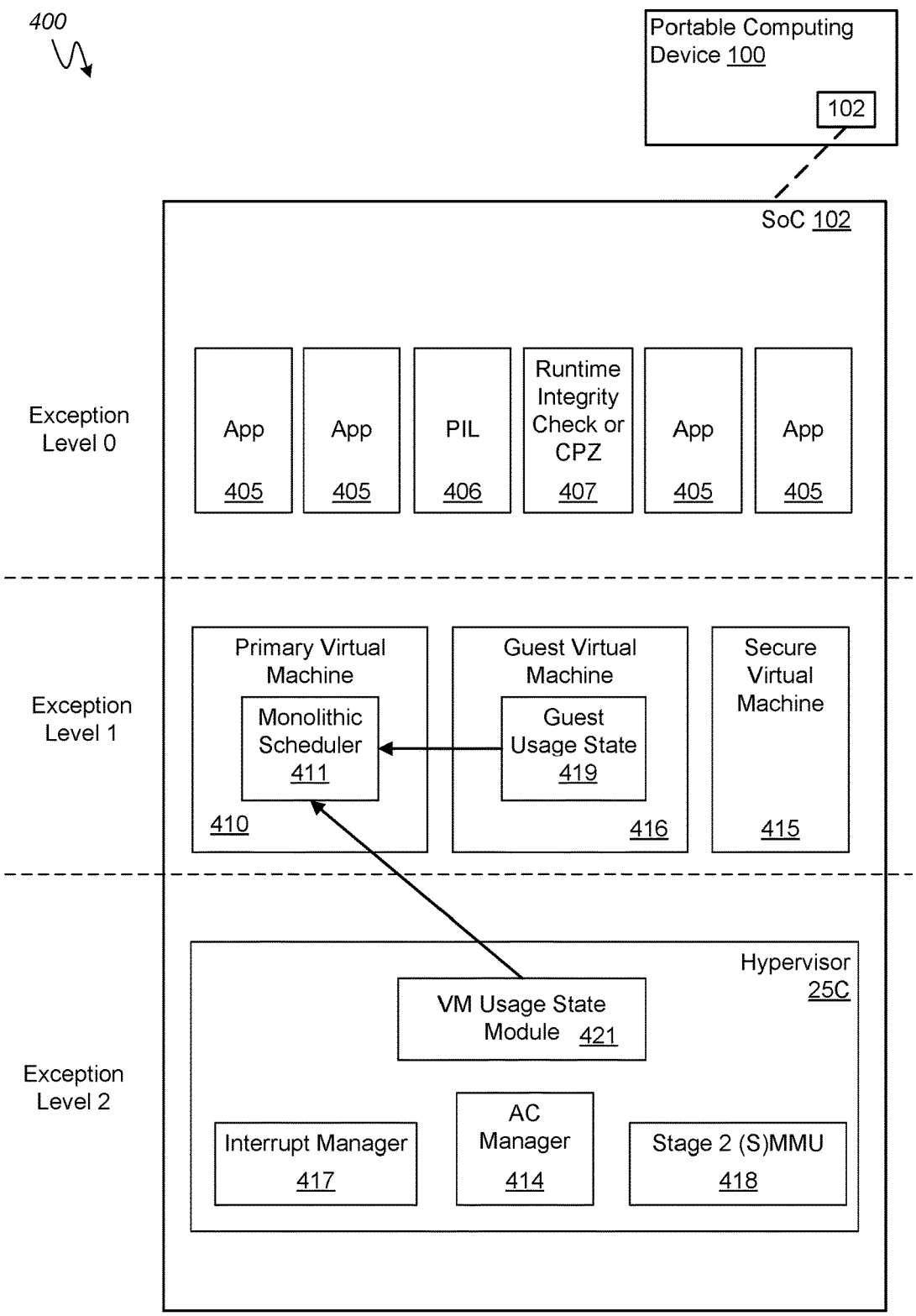
FIG. 4 illustrates an embodiment of an on-chip system for monolithic scheduling in a portable computing device ("PCD") running a hypervisor.

FIG. 4 illustrates an embodiment 400 of an on-chip system 102 for monolithic scheduling in a portable computing device ("PCD") 100 running a hypervisor 25C. The exemplary embodiment of a system 400 for intra-virtual machine (VM) context switches and inter-VM context switches with a unified, monolithic HYP-high level operating system (HLOS) active scheduler 411 for access control.

The system 400 may comprise application software 405, a graphics imaging library (PIL) 406, and a run-time integrity checker module 407. These three modules 405, 406, and 407 may have an exception level (EL0) corresponding to a user-mode of operation.

The system 400 may further comprise a primary virtual machine (VM) 410 comprising a monolithic scheduler 411 that is accessible by a secure virtual machine 415 and a guest virtual machine 416. The primary virtual machine 410, secure virtual machine 415, and guest virtual machine 416 may have an exception level (EL1) corresponding to a kernal mode of operation. The guest VM 416 may also record/track guest usage states 419.

The system 400 may further include a hypervisor 25C comprising an interrupt manager 417, a memory management unit 418, and an application core (AC) manager 414. The interrupt manager 417, memory management unit 418, and AC manager 414 may have an exception level (EL2) corresponding to a hypervisor mode of operation. The hypervisor 25C may record/track a virtual machine (VM) usage state 421 and provide that state to the monolithic scheduler 411 of the primary virtual machine (VM) 410.

The Hypervisor (HYP) 25C and secure virtual machine (VM) 415 may make the resource usage states 419, 421 readable to all modules in a secure manner meaning only meta data or no secrets are exposed with the primary guest VM 410. The system 400 may keep a secure timer 187 to guard against the primary guest VM 410 from launching DOS attacks against the HYP 25C or secure VM 415. The VM-usage states 421 may comprise meta states about at least one of: a queue size of the virtual cpu (VCPU) list, Quality of Service (QoS) indicators from the secure virtual machine, and Real-time integrity checker (RTIC) timer state of the user-mode exception level (EL0).

Figure 5:
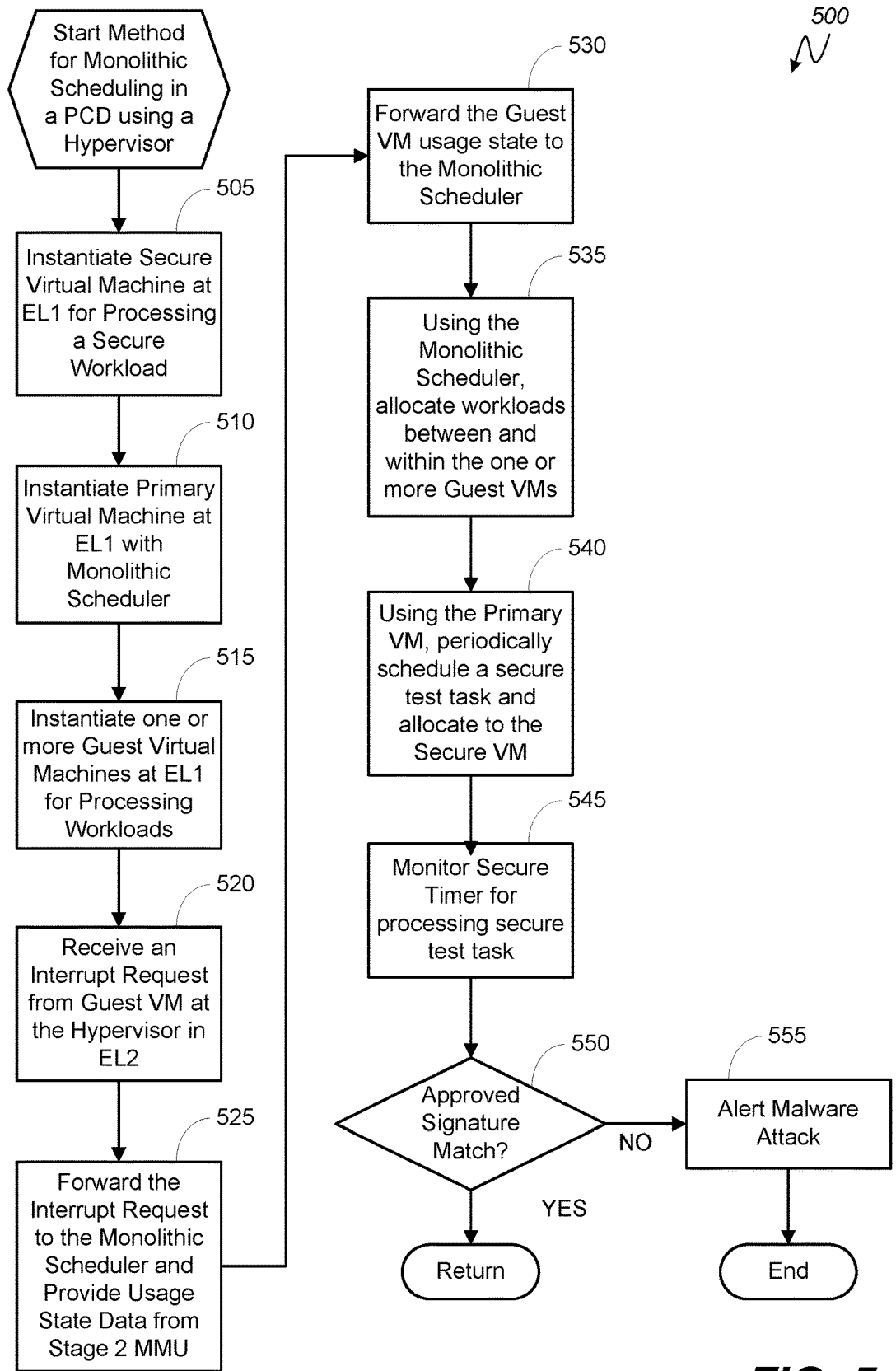
FIG. 5 is a high-level logical flowchart illustrating an embodiment of a method for monolithic scheduling in the PCD of FIG. 1 using a hypervisor.

FIG. 5 is a logical flowchart illustrating an embodiment of a method 500 for monolithic scheduling in the PCD of FIG. 1 using a hypervisor 25C. Beginning at block 505, a secure virtual machine 415 may be instantiated in EL1 for processing secure workloads such as, but not limited to, a credit card transaction in association with a mobile wallet. Next, at block 510 a primary virtual machine 410 in EL1 may be instantiated for the purpose of hosting a monolithic scheduler 411. Then, at block 515, one or more guest virtual machines 416 at EL1 may be instantiated for processing non-secure workloads such as, but not limited to, a gaming application.

At block 520, an interrupt request may be recognized by the hypervisor 25C which is subject to a second exception level (EL2). Because the hypervisor 25C does not include a scheduler, such as may be included in a typical scheduler-on-scheduler arrangement, at block 525 the interrupt request is forwarded to the monolithic scheduler 411 in the primary VM 410. Usage state data from the stage 2 MMU is also published to the monolithic scheduler 411. At block 530, the guest VM 416 makes available to the monolithic scheduler 411 its usage state. Next, with the context switch data having been made available to it, at block 535 the monolithic scheduler 411 may make inter-VM and intra-VM allocation of workloads among and within the guest VMs 416 and the secure VM 415.

At block 540, using the primary VM 410 a secure test task may be scheduled to the secure VM 415 and, at block 545, a secure timer 187 monitored. At decision block 550, if an approved signature match is returned, as would be understood by one of ordinary skill in the art, then the "yes" branch is followed and the method 500 returns. If an approved signature match is not returned, the method 500 concludes that there has been a malware attack and the "no" branch is followed to block 555 and an alert is generated. From there, the method 500 ends.

Figure 6A:
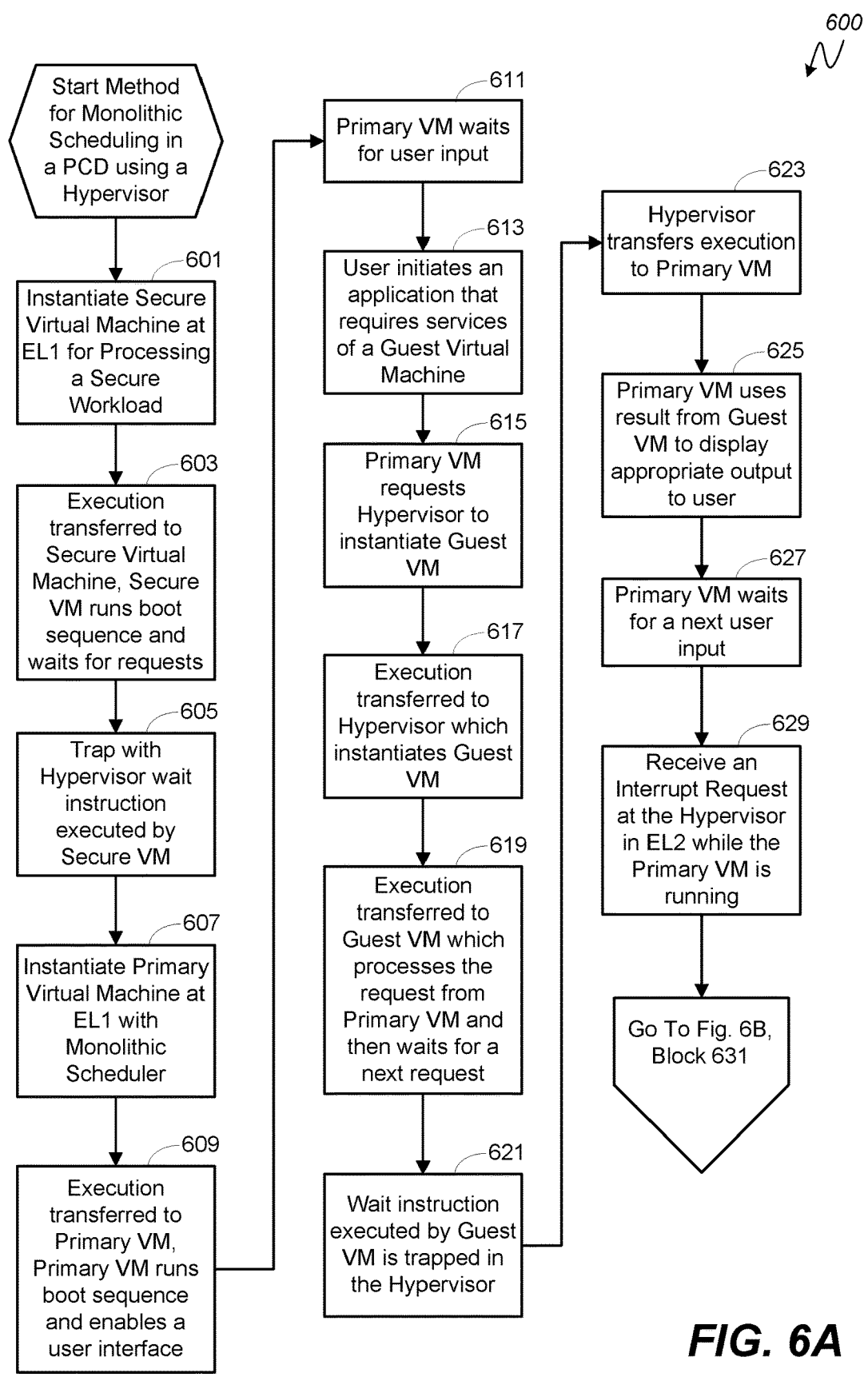
FIGS. 6A-6B is a detailed logical flowchart illustrating an embodiment of a method for monolithic scheduling in the PCD of FIG. 1 using a hypervisor.
Figure 6B:
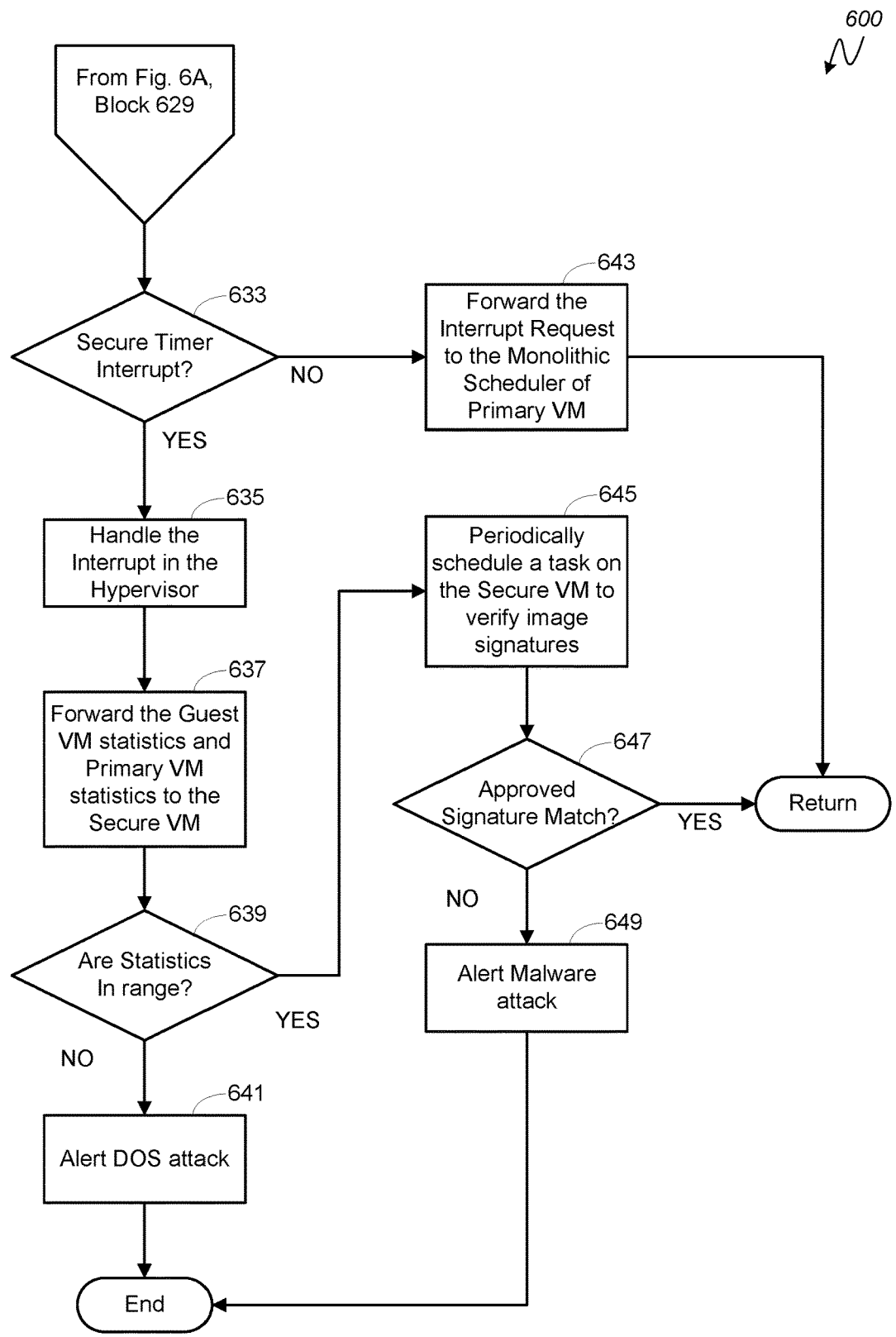

FIGS. 6A-6B is a detailed logical flowchart illustrating an embodiment of a method for monolithic scheduling in the PCD of FIG. 1 using a hypervisor. Beginning at block 601, a secure virtual machine 415 is instantiated at exception level 1 for processing a secure workload. Next, at block 603 execution is transferred to the secure virtual machine 415 and the secure virtual machine 415 runs through its boot sequence before waiting for a workload request. At 605, a wait instruction executed by the secure virtual machine 415 is trapped at the Hypervisor 25 which is at an exception level 2.

At block 607, a primary virtual machine 410 that includes a monolithic scheduler 411 is instantiated at exception level 1. Then, at block 609, execution is transferred to the primary virtual machine 410 and the primary virtual machine 410 runs through its boot sequence and enables a user interface on device 100. At block 611, the primary virtual machine waits for a user input. At block 613, a user input via the user interface operates to initiate an application 405 that requires services of a guest virtual machine 416. Next, at block 615, the primary virtual machine 410 requests the Hypervisor 25 to instantiate guest virtual machine 416. Execution is transferred at block 617 to the Hypervisor 25 which, in turn, instantiates the guest virtual machine 416.

At block 619, execution is transferred to the guest virtual machine 416 which processes the request from the primary virtual machine 410 and then waits for a next request. At block 621, a wait instruction executed by the guest virtual machine 416 is trapped at the Hypervisor 25. The Hypervisor transfers execution to the primary virtual machine 410 at block 623. At block 625, the primary virtual machine 410 uses the result from the guest virtual machine 416 to display an output to the user via the user interface. The primary virtual machine 410 waits for a next user input at block 627.

Subsequently, at block 629, an interrupt request is received at the Hypervisor 25 which the primary virtual machine 410 is running. At decision block 633, if the interrupt request is not from the secure timer then the "no" branch is followed to block 643 and the interrupt request is forwarded to the monolithic scheduler 411 running in the primary virtual machine 410 and the method 600 returns. If, however, at decision block 633 the interrupt request is determined to be generated by the secure timer then the "yes" branch is followed to block 635.

At block 635, the interrupt request is handled by the Hypervisor 25 and, at block 637, the usage state statistics associated with both the guest virtual machine 416 and the primary virtual machine 410 are forwarded to the secure virtual machine 415. Next, at decision block 639, if the usage state statistics do not fall within a predetermined range, then the "no" branch is followed to block 641 where a DOS attack alert is generated before the method 600 ends. If, however, at decision block 639 the usage state statistics do fall within a predetermined range then the "yes" branch is followed to block 645. At block 645, a task is periodically scheduled on the secure virtual machine 415 in order to verify image signatures. For each task periodically scheduled at block 645, at decision block 647 it is determined whether the signatures generate an approved match. The signature match is approved, then the "yes" branch is followed and the method 600 returns/continues. If, however, the signature match verification at decision block 647 is not approved, then the "no" branch is followed to block 649 where a malware attack alert is generated before the method 600 ends.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", "subsequently" etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the drawings, which may illustrate various process flows.

In one or more exemplary aspects, the functions described may be implemented in hardware, software, firmware, or any combination thereof. If implemented in software, the functions may be stored on or transmitted as one or more instructions or code on a non-transitory computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Therefore, although selected aspects have been illustrated and described in detail, it will be understood that various substitutions and alterations may be made therein without departing from the spirit and scope of the present invention, as defined by the following claims.

What is claimed is:

1. A method for monolithic workload scheduling in a portable computing device ("PCD") having a hypervisor, the method comprising:
    instantiating a primary virtual machine at a first exception level, wherein the primary virtual machine (VM) comprises a monolithic scheduler configured to allocate workloads within and between one or more guest virtual machines in response to one or more interrupts;
    instantiating a secure virtual machine at the first exception level;
    instantiating one or more guest virtual machines at the first exception level;

receiving an interrupt at a hypervisor associated with a second exception level;

forwarding the interrupt to the monolithic scheduler along with hardware usage state data and guest virtual machine usage state data;

generating one or more context switches with the monolithic scheduler, wherein the one or more context switches comprise at least one intra-VM context switch and at least one inter-VM context switch;

periodically scheduling a secure task for verifying software image signatures to the secure virtual machine;

monitoring a secure timer relating to the secure task; and based on the secure timer, determining the presence or absence of malware by determining whether a software image signature matches an approved signature.

2. The method of claim 1, wherein the hypervisor and secure virtual machine make resource usage states readable to the primary virtual machine and the one or more guest virtual machines in a secure manner such that only metadata is published.

3. The method of claim 1, further comprising generating a malware attack alert.

4. The method of claim 1, wherein the primary virtual machine enables a user interface.

5. The method of claim 1, wherein the guest virtual machine usage state data comprises metastates about at least one of a queue size of the virtual cpu (VCPU) list, Quality of Service (QoS) indicators from the secure virtual machine, and Real-time integrity checker (RTIC) timer state of the user-mode exception level (EL0).

6. The method of claim 1, wherein the portable computing device is battery powered.

7. The method of claim 1, wherein the portable computing device comprises at least one of a mobile telephone, a personal digital assistant, a pager, a smartphone, a navigation device, and a hand-held computer with a wireless connection or link.

8. A computer system for monolithic workload scheduling in a portable computing device ("PCD") having a hypervisor, the system comprising:

a system-on-chip (SoC) having a processor and memory, the processor and memory configured to execute:

application software, a graphics imaging library, and a run-time integrity checker module having a first exception level (EL0) corresponding to a user-mode of operation;

a primary virtual machine comprising a monolithic scheduler that is accessible by a secure virtual machine and a guest virtual machine, wherein the primary virtual machine, secure virtual machine, and guest virtual machine have a second exception level (EL1) corresponding to a kernal mode of operation; and a hypervisor comprising an interrupt manager, a memory management unit, and an application core manager, wherein the interrupt manager, memory management unit, and AC manager have a third exception level (EL2) corresponding to a hypervisor mode of operation, the hypervisor configured to record a virtual machine usage state and provide that state to the monolithic scheduler of the primary virtual, the hypervisor configured to periodically schedules secure task for verifying software image signatures to the secure virtual machine, monitor a secure timer relating to the secure task, and based on the secure timer, determine the presence or absence of malware by determining whether a software image signature matches an approved signature.

9. The system of claim 8, wherein the hypervisor and secure virtual machine make resource usage states readable to the primary virtual machine and the one or more guest virtual machines in a secure manner such that only metadata is published.

10. The system of claim 8, wherein interrupt requests generated by the secure timer are handled by the hypervisor.

11. The system of claim 8, wherein the primary virtual machine enables a user interface.

12. The system of claim 8, wherein the guest virtual machine usage state data comprises metastates about at least one of a queue size of the virtual cpu (VCPU) list, Quality of Service (QoS) indicators from the secure virtual machine, and Real-time integrity checker (RTIC) timer state of the user-mode exception level (EL0).

13. The system of claim 8, wherein the portable computing device is battery-powered.

14. The system of claim 8, wherein the portable computing device comprises at least one of a mobile telephone, a personal digital assistant, a pager, a smartphone, a navigation device, and a hand-held computer with a wireless connection or link.

15. A computer system for monolithic workload scheduling in a portable computing device ("PCD") having a hypervisor, the system comprising:

means for instantiating a primary virtual machine at a first exception level, wherein the primary virtual machine (VM) comprises a monolithic scheduler configured to allocate workloads within and between one or more guest virtual machines in response to one or more interrupts;

means for instantiating a secure virtual machine at the first exception level;

means for instantiating one or more guest virtual machines at the first exception level;

means for receiving an interrupt at a hypervisor associated with a second exception level;

means for forwarding the interrupt to the monolithic scheduler along with hardware usage state data and guest virtual machine usage state data;

means for generating one or more context switches with the monolithic scheduler, wherein the one or more context switches comprise at least one intra-VM context switch and at least one inter-VM context switch;

means for periodically scheduling a secure task for verifying software image signatures to the secure virtual machine;

means for monitoring a secure timer relating to the secure task; and means for determining, based on the secure timer, the presence or absence of malware by determining whether a software image signature matches an approved signature.

16. The system of claim 15, wherein the hypervisor and secure virtual machine make resource usage states readable to the primary virtual machine and the one or more guest virtual machines in a secure manner such that only metadata is published.

17. The system of claim 15, further comprising means for generating a malware attack alert.

18. The system of claim 15, wherein the guest virtual machine usage state data comprises metastates about at least one of a queue size of the virtual cpu (VCPU) list, Quality of Service (QoS) indicators from the secure virtual machine, and Real-time integrity checker (RTIC) timer state of the user-mode exception level (EL0).

19. The system of claim 15, wherein the portable computing device is battery powered.

20. The system of claim 15, wherein the portable computing device comprises at least one of a mobile telephone, a personal digital assistant, a pager, a smartphone, a navigation device, and a hand-held computer with a wireless connection or link.

21. A computer program product comprising a computer usable device having a computer readable program code embodied therein, said computer readable program code adapted to be executed to implement a method for monolithic workload scheduling in a portable computing device ("PCD") having a hypervisor, said method comprising:
  instantiating a primary virtual machine at a first exception level, wherein the primary virtual machine comprises a monolithic scheduler configured to allocate workloads within and between one or more guest virtual machines in response to one or more interrupts;
  instantiating a secure virtual machine at the first exception level;
  instantiating one or more guest virtual machines at the first exception level;
  receiving an interrupt at a hypervisor associated with a second exception level;
  forwarding the interrupt to the monolithic scheduler along with hardware usage state data and guest virtual machine usage state data;
  generating one or more context switches with the monolithic scheduler, wherein the one or more context switches comprise at least one intra-VM context switch and at least one inter-VM context switch;
  periodically scheduling a secure task for verifying software image signatures to the secure virtual machine;
  monitoring a secure timer relating to the secure task; and
  based on the secure timer, determining the presence or absence of malware by determining whether a software image signature matches an approved signature.

22. The computer program product of claim 21, wherein the hypervisor and secure virtual machine make resource usage states readable to the primary virtual machine and the one or more guest virtual machines in a secure manner such that only metadata is published.

23. The computer program product of claim 21, further comprising generating a malware attack alert.

24. The computer program product of claim 21, wherein the guest virtual machine usage state data comprises metastates about at least one of a queue size of the virtual cpu (VCPU) list, Quality of Service (QoS) indicators from the secure virtual machine, and Real-time integrity checker (RTIC) timer state of the user-mode exception level (EL0).

25. The computer program product of claim 21, wherein the portable computing device is battery powered.

26. The computer program product of claim 21, wherein the portable computing device comprises at least one of a mobile telephone, a personal digital assistant, a pager, a smartphone, a navigation device, and a hand-held computer with a wireless connection or link.

* * * * *